(12) United States Patent
Patel et al.

(10) Patent No.: US 10,242,684 B2
(45) Date of Patent: *Mar. 26, 2019

(54) SYSTEMS AND METHODS FOR ADJUSTING AUDIO LEVELS IN A PLURALITY OF AUDIO SIGNALS

(71) Applicant: Evertz Microsystems Ltd., Burlington (CA)

(72) Inventors: Alpesh Patel, Mississauga (CA); Rakesh Patel, Mississauga (CA); Jeff Wei, Richmond Hill (CA); Tony Zare, Ancaster (CA)

(73) Assignee: Evertz Microsystems Ltd., Burlington (CA)

( * ) Notice: Subject to any disclaimer, the term of this patent is extended or adjusted under 35 U.S.C. 154(b) by 12 days.

This patent is subject to a terminal disclaimer.

(21) Appl. No.: 15/445,605

(22) Filed: Feb. 28, 2017

(65) Prior Publication Data

US 2017/0229135 A1 Aug. 10, 2017

Related U.S. Application Data

(63) Continuation of application No. 13/083,202, filed on Apr. 8, 2011, now Pat. No. 9,620,131.

(51) Int. Cl.
*G10L 19/16* (2013.01)
*G11B 20/10* (2006.01)
(Continued)

(52) U.S. Cl.
CPC .......... *G10L 19/167* (2013.01); *G10L 19/005* (2013.01); *G10L 21/0316* (2013.01);
(Continued)

(58) Field of Classification Search
CPC .............. G10L 19/167; G10L 21/0316; G11B 20/10527; G11B 2020/10638
See application file for complete search history.

(56) References Cited

U.S. PATENT DOCUMENTS 5,471,651 A 11/1995 Wilson
5,530,761 A 6/1996 d'Alayer de Costemore d'Arc
(Continued)

FOREIGN PATENT DOCUMENTS

JP 2002027352 A 1/2002
JP 2002165152 A 6/2002
(Continued)

OTHER PUBLICATIONS

Carroll, T. and Riedmiller, J., "Audio for Digital Cable Television", NAB Engineering Handbook, Section 5: Video Production and Studio Technology, chapter 5.18, Edited by Edmund A. Williams, 2007, pp. 1309-1330.
(Continued)

*Primary Examiner* — Ping Lee
(74) *Attorney, Agent, or Firm* — Bereskin & Parr LLP/S.E.N.C.R.L., s.r.l.

(57) ABSTRACT

Systems and methods for adjusting audio levels in a plurality of audio signals are disclosed. One or more input signals containing one or more audio signals are depacketized. The audio signals are analyzed to determine if audio levels of the signals correspond to a desired audio level for at least some of the signals. The audio levels of signals that do not correspond are adjusted. Packets that do not require adjustment and the resulting adjusted packets are combined to form one or more output signals corresponding to the one or more input signals.

13 Claims, 4 Drawing Sheets

(51) Int. Cl.
 *G10L 21/0316* (2013.01)
 *G10L 19/005* (2013.01)
 *H04H 60/58* (2008.01)

(52) U.S. Cl.
 CPC ............... *G11B 20/10527* (2013.01); *G11B 2020/10638* (2013.01); *H04H 60/58* (2013.01)

(56) References Cited

U.S. PATENT DOCUMENTS

| | | | |
|---|---|---|---|
| 5,539,741 | A | 7/1996 | Barraclough et al. |
| 5,579,404 | A | 11/1996 | Fielder et al. |
| 5,631,714 | A | 5/1997 | Saadoun |
| 5,822,018 | A | 10/1998 | Farmer |
| 6,763,275 | B2 | 7/2004 | Naruki et al. |
| 7,398,207 | B2 | 7/2008 | Riedl |
| 7,454,331 | B2 | 11/2008 | Vinton et al. |
| 7,583,809 | B2 | 9/2009 | Okimoto et al. |
| 2002/0173864 | A1 | 11/2002 | Smith |
| 2005/0119881 | A1 | 6/2005 | Seidman et al. |
| 2006/0002572 | A1* | 1/2006 | Smithers ............ G10L 25/00 381/104 |
| 2007/0121966 | A1 | 5/2007 | Plastina et al. |
| 2007/0256014 | A1 | 11/2007 | Du Breuil |
| 2008/0091420 | A1 | 4/2008 | Chuang |
| 2008/0167864 | A1 | 7/2008 | Faller et al. |
| 2009/0063159 | A1 | 3/2009 | Crockett |
| 2009/0067644 | A1 | 3/2009 | Crockett et al. |
| 2009/0190779 | A1 | 7/2009 | Chung |
| 2009/0274322 | A1 | 11/2009 | Chang et al. |
| 2009/0290727 | A1 | 11/2009 | Seefeldt |
| 2009/0304190 | A1 | 12/2009 | Seefeldt et al. |
| 2010/0054498 | A1 | 3/2010 | Sollenberger et al. |
| 2010/0158126 | A1 | 6/2010 | Bai et al. |
| 2010/0241258 | A1 | 9/2010 | Medina et al. |

FOREIGN PATENT DOCUMENTS

| | | |
|---|---|---|
| KR | 1020080046887 | 5/2008 |
| KR | 1020090091537 | 8/2009 |

OTHER PUBLICATIONS

Riedmiller, J.C., "An Analysis of Audio for Digital Cable Television Recommendations for the Digital Transition via Auto Metadata", NCTA Technical Papers, 2001.

Starzynski, J., "Managing DTV LOUDNESS with dialnorm", Broadcasting Engineering, Mar. 1, 2007, pp. 63-63, vol. 49, No. 3 http://broadcastengineering.com/audio/broadcasting_managing_dtv_loudness.

Jacobs, B., "Dialnorm: A good idea gone bad", Broadcast Engineering, Dec. 1, 2007, pp. 66-72, vol. 49, No. 12 http://broadcastengineering.com/audio/dialnorm-good-idea-gone-bad.

Lund, T., "Control of Loudness Across Broadcast Platforms", TS Electronic A/S, Risskov, Denmark, 2009, http://www.tcelectronic.com/media/loudness_nab2009.pdf.

Riedmiller, J.C. et al., "Intelligent Program Loudness Measurement and Control: What Satisfies Listeners?", Audio Engineering Society Convention Paper, Presented at the 115th Convention, Oct. 10-13, 2003, New York.

Dolby Technical Paper, "Dolby DP600 and DP600-C Program Optimizer Overview for Postproduction Facilities", Dolby DP600 Program Optimizer: Postproduction. Available Online: www.dolby.com/us/en/.../dolby-dp600-overview-for-postproduction-tech-paper.pdf.

Optimod Surround 8585, Orban/CRL, www.orban.com. Available Online: www.orban.com/orban/products/television/8685/.../om8685%20brochure_r06.pdf.

\* cited by examiner

SYSTEMS AND METHODS FOR ADJUSTING AUDIO LEVELS IN A PLURALITY OF AUDIO SIGNALS

CROSS-REFERENCE TO RELATED APPLICATIONS

This application is a continuation of U.S. patent application Ser. No. 13/083,202, filed on Apr. 8, 2011, which is incorporated by reference herein in its entirety.

FIELD

The described embodiments relate to systems and methods for adjusting the audio loudness in a plurality of audio signals.

BACKGROUND

Digital audio signals, and digital video signals containing audio signals, are typically transmitted in data streams according to various standards and protocols. A common problem with such audio signals, which may also be referred to as audio streams, is a wide variation in the loudness levels of different portions of the audio encoded within the audio signal. When the audio signal is reproduced as audio, the resulting audible signal has correspondingly large loudness variations. In some situations, portions of an audio signal are intentionally encoded such that they are reproduced at different audio levels. In other cases, different portions of the audio signal are produced independently of one another with the result that they may be encoded to produce audio at different loudness levels.

Many standards and systems for transmitting audio signals (some embedded with a corresponding video signal) allow a plurality of audio signals to be transmitted within a single transport stream. Each audio signal is divided into blocks of data, which are then transmitted as a series of packets. The packets of the different audio signals are transmitted together in the transport stream. In some standards, the different audio signals may be combined by time multiplexing them such that the audio signal is divided into different time slices and each audio signal is assigned one of the time slices. In other standards, the packets corresponding to each signal may be mixed in any order in the transport stream. The packets of each audio signal are tagged with a signal identifier, allowing them to be combined together to assemble the original audio signal.

In a typical audio or audio-visual data transmission system, some transport streams may include a plurality of audio signals, each with a varying audio level. It is desirable to analyze and adjust the audio levels of such audio signals in one or more audio signals such that at least some of the audio signals may be reproduced with a desirable audio level.

SUMMARY

In one aspect, some embodiments provide a system for adjusting the audio level of a plurality of audio signals in a transport stream, the system comprising: one or more input terminals for receiving the audio signals; an audio signal extraction block coupled to the input terminals to extract packets corresponding to the audio signals; an audio level adjustment block coupled to the audio signal extraction block to analyze the audio levels of the audio signals and to provide audio level adjustment signals corresponding to differences in the audio levels and corresponding desired audio levels; and an audio signal re-assembly block to generate audio adjusted packets corresponding to the audio level adjustment signals.

In another aspect, some embodiments provide a method of adjusting the audio level of a plurality of audio signals, the method comprising: receiving one or more input signals, wherein each input signal includes one or more packetized audio signals; comparing an audio levels of at least two of the audio signals to a respective desired audio level; adjusting the audio level in packets of at least one of the audio signals to provide audio adjusted packets; and combining unadjusted packets and the audio adjusted packets to form one or more output signals corresponding to the one or more input signals.

In some embodiments, the audio signals are received in the form of input signals containing a plurality of audio signals. One or more of the inputs signals may be transport streams containing packetized input signals.

In some embodiments, the audio signal extraction block contains a de-multiplexor for extracting and separating packets corresponding to different audio signals from the input signals.

In some embodiments, the audio level adjustment block includes one or more gain adjustment blocks for comparing the audio levels of some of the audio signals to a corresponding desired audio level and for generating the audio level adjustment signals corresponding to differences between the audio levels and the corresponding desired audio level.

In some embodiments, some of the audio signals include a gain control metadata value and the corresponding audio level adjustment signals indicates an adjustment in the gain control metadata value. In such embodiments, the audio level is adjusted by varying the gain control metadata value in one or more packets of the audio signal.

In some embodiments, some of the audio level adjustment signals provide a modified version of the audio data for one or more packets in the audio signal, wherein the modified version includes audio data encoded at a modified audio level. The audio level is modified by replacing the audio data in at least some packet in the audio signal.

In some embodiments, some the audio level adjustment signals indicate both an adjustment in the gain control metadata value and provide a modified version of the audio data. The audio level for such signals is modified by both varying the gain control metadata value in one or more packets in the audio signal and by replacing the audio data in at least some of the packets in the audio signal.

In some embodiments a plurality of input signals corresponding each containing a plurality of audio signals is received. In some embodiments, different input signals may be received at different types of terminals according to different types of data transmission and communications standards and protocols.

BRIEF DESCRIPTION OF THE DRAWINGS

Various embodiments of the invention will now be described with reference to the drawings, in which.

DESCRIPTION OF EXEMPLARY EMBODIMENTS

Numerous specific details are set forth in order to provide an understanding of the exemplary embodiments described herein. However, it will be understood by those of ordinary skill in the art that the embodiments described herein may be practiced without these specific details or with variation of these specific details. In some instances, well-known methods, procedures and components have not been described in detail so as not to obscure the embodiments described herein. Furthermore, this description is not to be considered as limiting the scope of the embodiments described herein in any way, but rather as merely describing the structure or operation of several example embodiments.

The embodiments of the systems and methods described herein, and their component nodes, devices and operations, may be implemented in hardware or software, or a combination of both.

Figure 1:
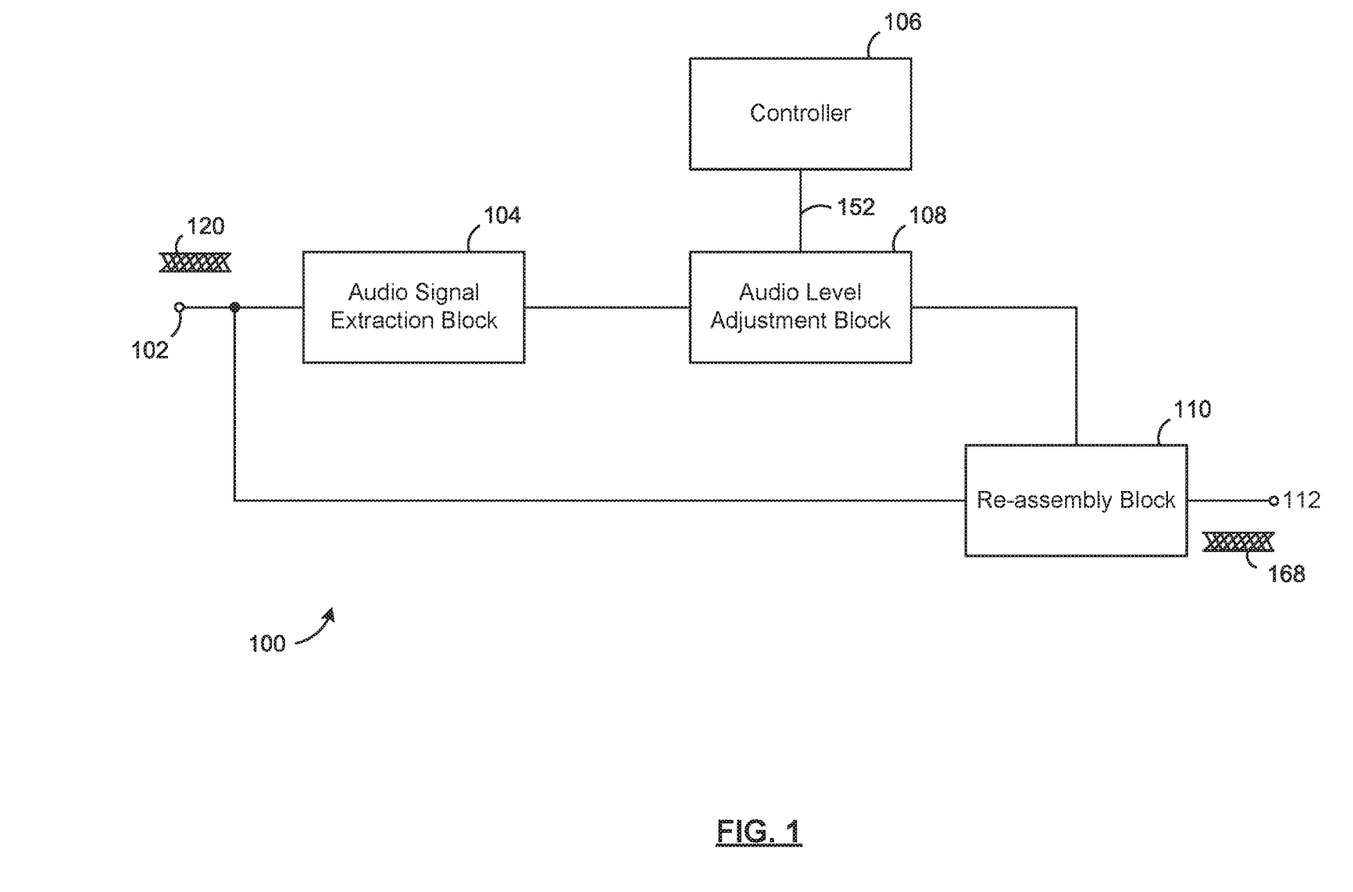
FIG. 1 is a block diagram of an example system for analyzing and adjusting audio levels of a plurality of audio signals.

Reference is first made to FIG. 1, which illustrates a system 100 for analyzing and adjusting the audio level of a plurality of audio signals embedded in respective audio signals. The audio signals are transmitted together in a transport stream. System 100 includes an input terminal 102, an audio signal extraction block 104, a controller 106, an audio level adjustment block 108, an audio signal re-assembly block 110 and an output terminal 112.

Figure 2:
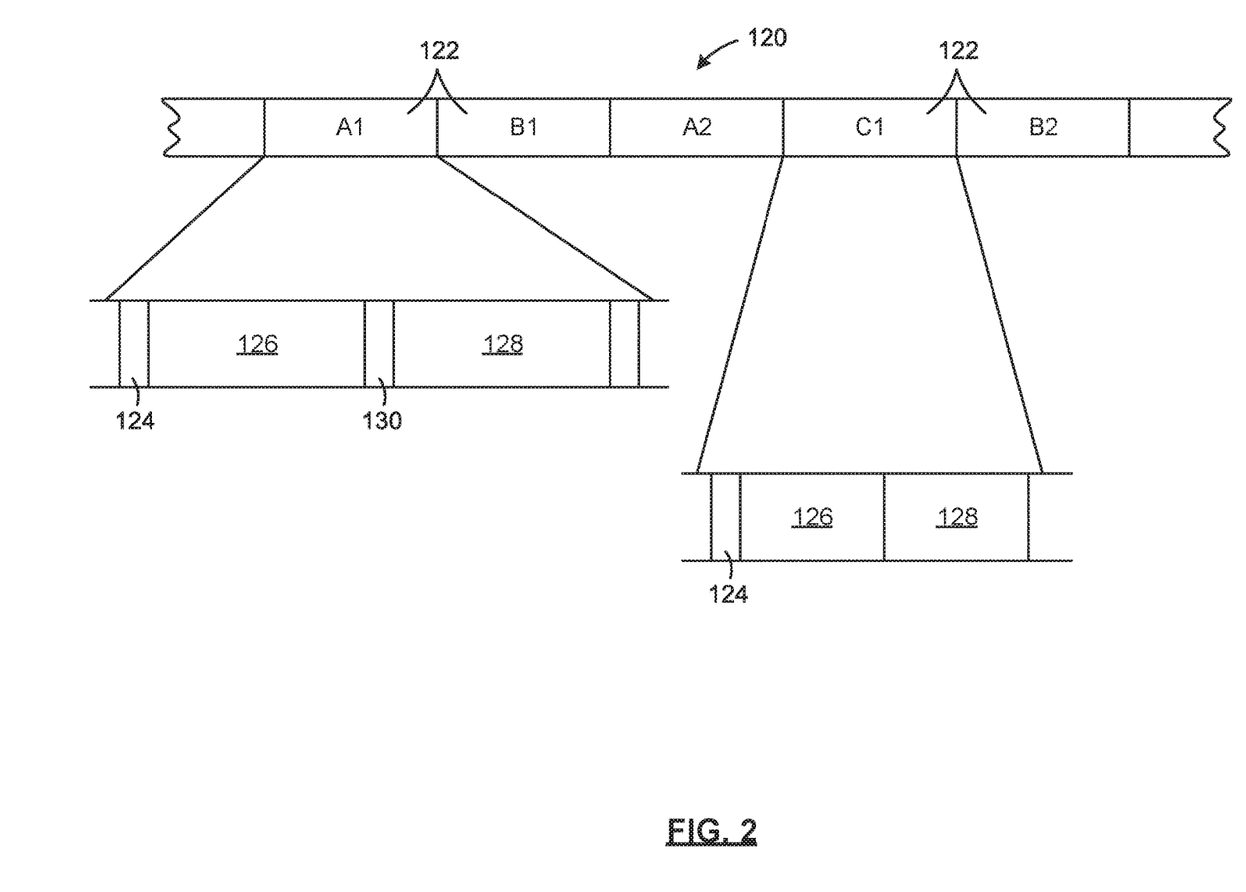
FIG. 2 illustrates a transport stream containing a plurality of audio signals.

Reference is additionally made to FIG. 2. An input signal 120 is received at input terminal 102. In this example, input signal 120 is a transport stream that includes the plurality of audio signals A, B, C, . . . . Each audio signal encodes a digital audio signal. Each audio signal has been divided into blocks of data and packetized into a series of packets 122 according to the standards used for the audio signal and for the transport stream.

Each packet 122 includes one or more packet data fields 124 and one or more audio data fields 128. Some packets 122 also include an audio metadata field 130 in accordance with the respective audio standards used for each audio signal. Some packets may also optionally include other data 126 such as video data in accordance with the standards used for each audio signal. All such streams and signals are referred to herein as audio streams or audio signals herein, regardless of the presence or type of other data present in the streams or signals.

The audio data for each audio signal may be extracted from the series of packets for that audio signal and may be reassembled to recreate the digital audio signal encoded in the audio signal. The digital audio signal may be reproduced using appropriate converting, amplifying and reproduction equipment to generate an audible signal corresponding to the digital audio signal. For example, a digital audio signal may be converted into an analog audio signal with a digital-to-analog converter (DAC), which is then amplified by an audio amplifier. The amplified analog audio signal is applied to a speaker or other sound transducer to produce audible sound.

Some audio signals include audio metadata that may include an audio amplification index that indicates to the converting or amplifying equipment an audio level at which the digital audio signal is to be reproduced. For example, in Dolby Laboratories™ AC-3 audio compression system, an audio metadata value called Dialnorm is used to control playback gain. Other audio compression and encoding systems may provide other mandatory or optional gain control metadata values. Such gain control metadata values are typically intended to be set such that dialog in a digital audio signal is reproduced at a consistent audio level or volume level or sound pressure level from program to program and channel to channel. The gain control metadata value is combined in the converting or amplifying equipment or both with a listening volume set by a listener to produce audible sound at an audio level corresponding to both the gain control metadata value and the listening volume. In practice, different parts of a digital audio signal are frequently reproduced at widely varying levels often requiring a listener to change the gain of the amplifying equipment to maintain a desired listening volume.

The input signal is received by an extraction block 104 which extracts each packet 122 from the input signal 120. Packets 122 corresponding to each audio signal are stored within the extraction block 104. Packets corresponding to each audio signal are sequentially transmitted from the extraction block 104 to adjustment block 108.

Adjustment block 108 analyzes the audio data encoded in each audio signal. Adjustment block 108 obtains the series of packets for each audio signal and, in some embodiments, decodes the audio data from the audio signal to re-assemble at least a portion of the digital audio signal. In addition, the audio adjustment block extracts any audio gain control adjustment value in the audio signal. Adjustment block 108 analyzes the digital audio signal and any audio gain control adjustment value in the audio signal and determines if the digital audio signal is encoded at an undesirable audio level. If so, the adjustment block 108 determines an adjustment for the digital audio signal.

In some embodiments, the adjustment block 108 may sample portions of some or all of the audio data encoded in the respective audio signals. The adjustment block may determine adjustments for some or all of the audio signals based on the respective samples of the audio signals.

In some audio signals, the audio data or audio metadata may include data indicating the audio level of the audio signal. In such embodiments, the adjustment block may not decode the audio data or reassemble or sample the audio signal to determine the audio level at which the audio signal would be reproduced. If such an audio signal also includes a gain control adjustment value, the adjustment block may adjust the gain control adjustment value based on the recorded audio level. For other audio signals, the adjustment block may decode the encoded audio signal and then re-encode the audio signal at a different audio level based on the recorded audio level.

Adjustment block 108 contemporaneously analyzes the audio level of and determines an adjustment for each of the audio signals in the input signal 122. Typically, the determined adjustment corresponds to the packetization of each audio signal, such that the audio data or the audio metadata (or both) in each packet or of a group of packets from each audio signal may be adjusted as required such that the audio signal will be reproduced at a desired audio level. Controller 106 is coupled to adjustment block 108 to provide a desired audio level signal 152 to the adjustment block corresponding to the desired audio level or a desired audio level range.

The adjustment determined by audio adjustment block is transmitted to an re-assembly block 110. Re-assembly block 110 also receives the input signal 120. Re-assembly block 110 modifies at least some of the packets in the input signal in accordance with the adjustment determined by the audio adjustment block. The packets 168 are then sequentially transmitted to output terminal 112. The digital audio data field 128 or the audio metadata 130 for the audio signals that require adjustment are modified in the output signal in accordance with the adjustment determined by the audio adjustment block.

Figure 3:
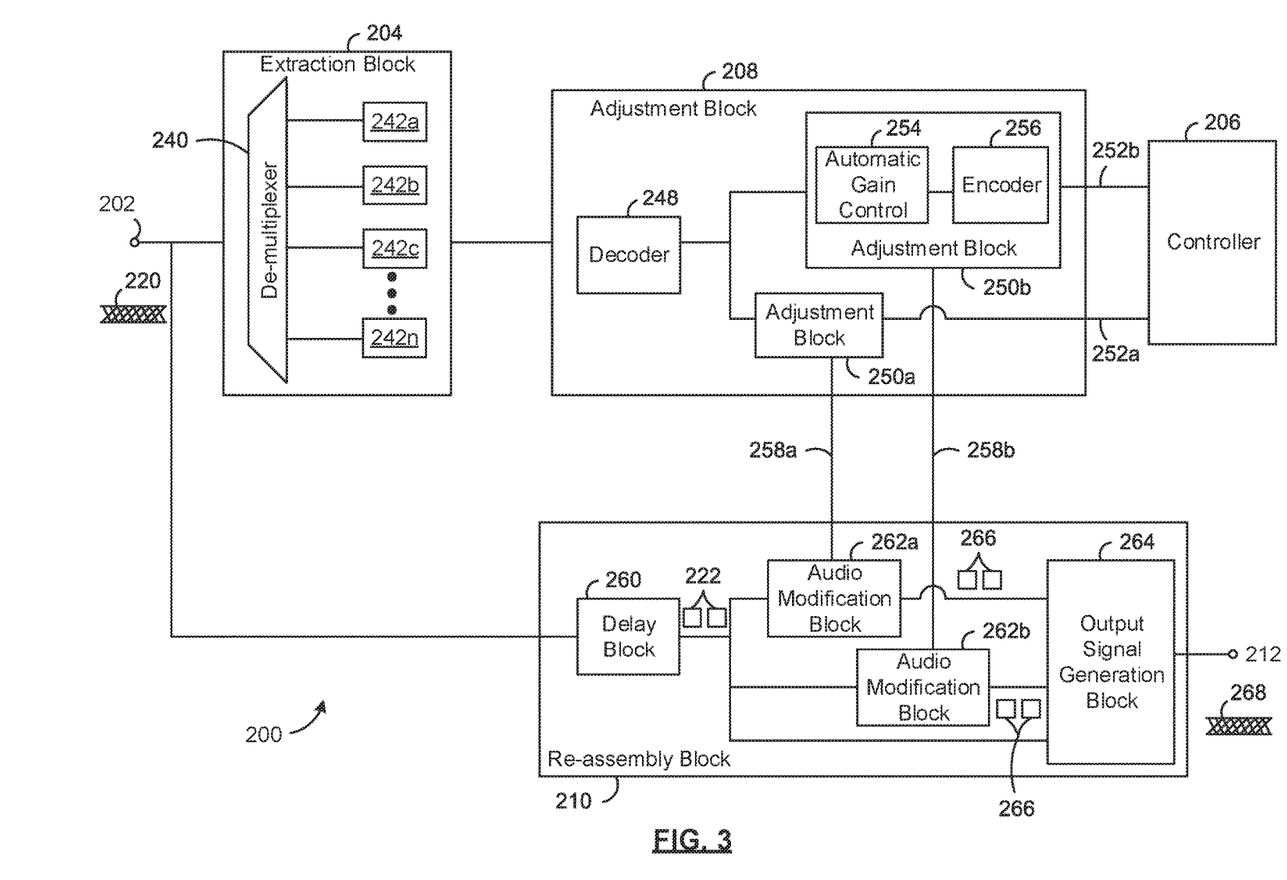
FIGS. 3 and 4 illustrates other example systems for analyzing and adjusting audio levels of plurality of audio signals.

Reference is next made to FIG. 3, which illustrates another system 200 for analyzing and adjusting the audio level of a plurality of audio signals embedded in an audio signal. Elements of system 200 corresponding to elements of system 100 are identified by similar or corresponding reference numerals.

System 200 includes an audio signal extraction block 204, a controller 206, an audio level adjustment block 208 and an audio signal re-assembly block 210.

Extraction block 204 includes a de-multiplexer 240 and a plurality of first in-first out (FIFO) buffers 242a, 242b, ... ,242n. Each FIFO buffer operates in known manner to receive and store data and then provide the stored data in the order in which it was received by the FIFO buffer. De-multiplexer 240 is coupled to input terminal 202 from which it receives an input signal 220. Input signal 220 is similar to input signal 120 (FIG. 1) of system 100. De-multiplexer 240 extracts each of the plurality of audio signals in the input signal 220 and records successive packets 222 of each audio signal in one of the FIFO buffers 242a, 242b, ... ,242n.

Adjustment block 208 includes a decoder 248, and a plurality of gain adjustment blocks 250a, 250b. Decoder 248 extracts packets 222 from the FIFO buffers 242a, 242b, ... ,242n. For each audio signal A, B, C, ... in the input signal 220, the decoder sequentially decodes the audio data and any audio metadata relevant to the audio level at which the encoded audio signal will be reproduced. The decoder transmits the audio data for each audio signal to one of the gain adjustment blocks 250a, 250b.

Different types of audio signals may require different types of audio level adjustments. Each different type of audio level adjustment may be provided by a different gain adjustment block 250.

For example, an audio signal with an embedded gain control metadata value may be processed by gain adjustment block 250a that determines the audio level of the audio signal. If the audio level does not correspond to a desired audio level or audio level range, then the gain adjustment block 250a determines an adjusted gain control metadata value to modify the audio level at which the audio signal will be reproduced as an audible signal. Typically, the desired audio level (which may be an audio level range) for each audio signal is provided by controller 206 in the form of a desired audio level signal 252a. For example, if the audio level of the encoded audio signal is higher than the desired audio level, the gain control metadata value is adjusted so that the audio signal will be reproduced at a lower audio level. Conversely, if the audio level of the encoded audio signal is lower than the desired audio level, the gain control metadata value is adjusted so that the audio signal will be reproduced at a high audio level. Gain adjustment block 250a generates an audio level adjustment signal 258a corresponding to each packet of each audio signal processed by the gain adjustment block 250a. The adjustment signals 258a generated by gain adjustment block 250a identify the packet to which each adjustment signal corresponds and the adjustment required for the gain control metadata value in that packet.

An audio signal that does not include an embedded gain control metadata value will require a different adjustment. Gain adjustment block 250b includes an automatic gain control (AGC) block 254 and an encoder 256. For each audio signal processed by gain adjustment block 250b, the gain adjustment block 250b receives a desired audio level signal 252b from controller 206. The AGC block receives the decoded audio signal for the audio signal and generates a corresponding adjusted audio signal having an adjusted audio level corresponding to the desired audio level signal for that audio signal. The adjusted audio signal is received by encoder 256, which encodes the adjusted audio signal in a format suitable for the audio signal. Gain adjustment block 250b also generates an adjustment signal 258b for each packet of each audio signal processed by gain adjustment block 250b. The adjustment signals generated by gain adjustment block 250b identify the packet to which each adjustment signal corresponds and includes the re-encoded adjusted audio signal for that packet.

The adjustment block 208 is shared for all audio signals in the input signal 220. The individual gain adjustment blocks 250a, 250b may be time multiplexed or otherwise shared between different audio signals and will typically include or have access to data storage elements to record audio data and other data for each audio signal, including the desired audio level for that signal. In various embodiments, the adjustment block may be designed to be scalable such that additional instances of a type of gain adjustment block may be added to allow an increased number of audio signals to be processed by the adjustment block 208. Similarly, in various embodiments, a plurality of decoders may be provided to allow an increased number of audio signals to be decoded and provided to the gain adjustment blocks.

The gain adjustment blocks 250a, 250b generate the audio level adjustment signals 258a, 258b on a packet by packet basis such that the adjustment signals can be used to modify the audio level at which the audio data in each packet will be ultimately be reproduced. The gain adjustment blocks 250a, 250b may determine the audio level adjustment signals based on audio content from a plurality of packets in an audio signal. Typically, a gain adjustment block will analyze audio data from a series of packets in an audio signal to determine the adjustment required for a packet. As a result the adjustment signal 258a, 258b for a particular packet may be determined based on the plurality of packets that are sequentially before or after (or both before and after) the particular packet. The gain adjustment blocks may use a variety of techniques to determine the adjustment required. For example, a gain adjustment block may analyze audio data from moving window of packets in an audio signal. The moving window of packets may correspond to a various time periods and the length of the window may be varied. In some embodiments, a gain adjustment block may apply various transforms or techniques to audio data to identify changes that require a faster or slower rate of adjustment in the audio level of the audio signal. For example, if a transition from a program portion to an advertisement portion is detected, a gain adjustment block may adjust the audio level for the signal more rapidly than during an ongoing program section. One example of a method of adjusting the gain of a signal is described in U.S. Pat. No. 8,275,153, which is incorporated herein by reference.

Audio signal re-assembly block 210 includes a delay block 260 and one or more audio modification blocks 262a, 262b and output signal generation block 264. Each audio modification block 262a, 262b is coupled to one or more of the gain adjustment blocks 250a, 250b and complements the operation of the coupled gain adjustment blocks.

Re-assembly block 210 receives input signal 220 from the input terminal 202. Reassembly block 210 also receives the respective adjustment signals 258a, 258b generated by the adjustment block 208 corresponding to at least some of the audio signals in the input signal. As input signal 220 is processed through the extraction block 204 and the adjustment block 208, the processing takes some time. The input signal 220 is received by delay block 260, which buffers the packets 222 in input signal so that the packets may be adjusted in accordance with the corresponding adjustment signal 258a, 258b.

The operation of each modification block 262a, 262b depends on the format of the packets in the audio signals processed by the modification block 262a, 262b.

Audio modification block 262a is coupled to gain adjustment block 250a. Audio modification block 262a receives packets 222 for one or more input signals 220 from delay block 260 and corresponding adjustment signals 258a, 258b from the coupled gain adjustment block. The adjustment signals 258a generated by gain adjustment block 250a identify a packet and the adjustment required in the gain control metadata value in that packet. For each adjustment signal 258a, audio modification block 262a obtains the corresponding packet 222 from delay block 260 and modifies the gain control metadata value in the packet, thereby producing an audio adjusted packet 266.

Audio modification block 262b is coupled to gain adjustment block 250b from which it receives adjustment signals 258b. The adjustment signals generated by gain adjustment block 250b identify a packet and include re-encoded audio data for that packet. For each adjustment signal 258b, audio modification block 262ba obtains the corresponding packet 222 from the delay block 260 and modifies the audio data in the packet, thereby producing an audio adjusted packet 266.

The audio adjusted packets produced by the audio modification blocks are transmitted to the output signal generation block 264, which combines the audio adjusted packets 266 into an output signal 268 at output terminal 212. Devices (not shown) coupled to output terminal 212 may receive the output signal. In this embodiment, the output signal 268 has the same format as the input signal 220. For example, in this example, the input signal is a transport stream comprising a series of packets. Output signal 268 is also a transport stream comprising a series of corresponding packets in which the audio data, audio metadata or both have been adjusted. In this embodiment, the remaining data is not modified. In this embodiment, and transport stream data is copied from the input signal to the output signal, except as may be needed to reflect any changes in the audio data or audio metadata. In this way, the output signal essentially takes the place of the input signal, with only the audio levels of the various encoded audio signals having been varied in accordance with the desired audio levels for each audio signal. In some embodiments, the output signal may optionally be assembled with packets ordered in the same order as the input signals.

Some packets in an input signal 220 may not be modified and may simply be duplicated in the corresponding output signal 268. For example, some packets may correspond to data other than an audio signal. Some packets in an audio signal or some entire audio signals may not require adjustment either because the audio signal or at least a portion is within the desired audio level criteria or because the particular audio signal is designated as not to be processed for audio level adjustment. Such packets are obtained by the output signal generation block 264 and added to the output signal 268.

In other embodiments, the output signal may include additional changes relative to the input signal. For example, the packet data and other data may be modified in some packets.

Figure 4:
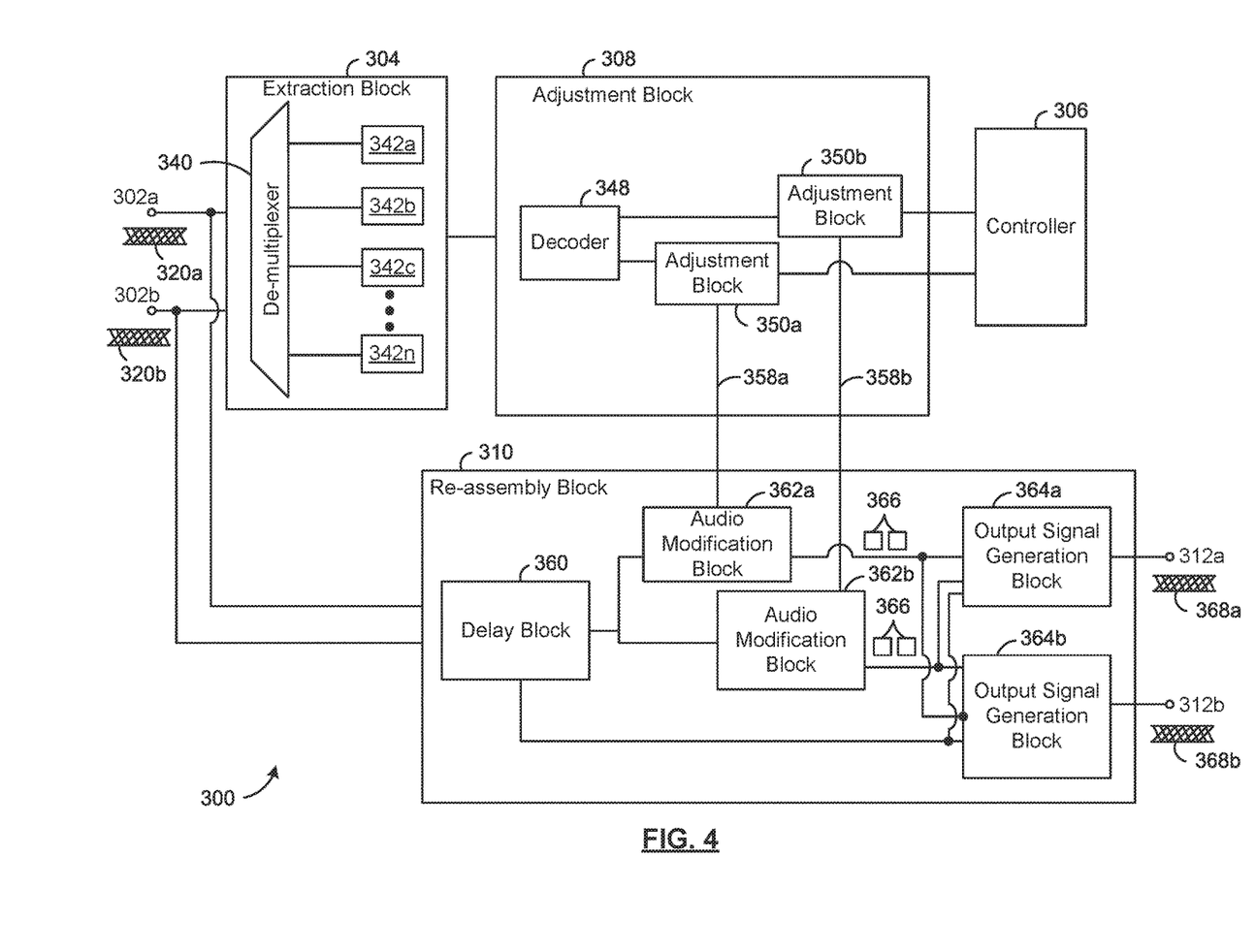

Reference is next made to FIG. 4, which illustrates another system 300 for analyzing and adjusting the audio level of a plurality of audio signals embedded in an audio signal. Elements of system 300 corresponding to elements of systems 100 and 200 are identified by similar or corresponding reference numerals.

System 300 has a plurality of input terminals 302a, 302b at which a plurality of input signals 320a, 320b are received. Each of the input signals may be any type of signal or stream that includes packetized audio signals, each of which includes audio data corresponding to a digital audio signal. Each audio signal from each input signal is processed as described above in relation to system 200. The packets of each audio signal are extracted from their respective input signals and stored in a buffer 342a, 342b, . . . ,342n by audio signal extraction block 304 that includes de-multiplexer 340. The audio level of each audio signal is progressively analyzed in audio level adjustment block 308. Decoder 348 extracts packets of each audio signal from buffer 342a, 342b, . . . ,342n analyzed by gain adjustment blocks 350a, 350b adapted to analyze the audio signal, depending on its format. The gain adjustment blocks 350a, 350b generates audio level adjustment signals 358a, 358b based on a desired audio level received from controller 306 for at least some of the packets in at least some of the audio signals.

Each input signal 320a, 320b is coupled to audio signal re-assembly block 310. Each input signal is coupled to a delay block 360 which extracts packets from the input signals and buffers the input signals for processing by audio modification blocks 362a, 362b, which adjusts individual packets based on the corresponding audio level adjustment signals 358a, 358b. The resulting audio adjusted packets 366 are combined by the output signal generation blocks 364a, 364b into an output signal 368a, 368b at output terminals 312a, 312b. One output signal is generated for each input signal and the output signal includes a packet corresponding to each packet in the input signal such that the resulting output signal contains the same audio signals as the input signal.

In some embodiments, the different input signals 320a, 320b may be processed by separate audio signal re-assembly blocks 310. In other embodiments, different input signals may be de-packetized and buffered separately, but may then be processed by a shared set of audio modification blocks 362a, 362b. In such embodiments, the audio adjusted packets 366 may be buffered before being combined into the respective output signals 368a, 368b. In some embodiments, the delay block may record a signal identifier unique to each input signal 320a, 320b with each packet extracted from the input signal. The signal identifier may then be used to identify the output signal in which the corresponding audio adjusted packet should be transmitted.

The systems described above allow the audio levels of a plurality of audio signals to be adjusted contemporaneously. In some embodiments, one or more of the audio signals may be adjusted without reassembling or analyzing all of the audio data corresponding to an audio signal. For example, a gain adjustment block may sample periodic portions of the audio data in an audio signal and may generate an audio level adjustment signal based on the sampled portions of the audio signal. In such embodiments, the audio level adjustment signal may be applied to series or plurality of packets in an audio signal to generate audio adjusted packets.

Various embodiments have been described here by way of example only. Various modification and variations may be made to these exemplary embodiments without departing from the spirit and scope of the invention, which is limited only by the following claims.

We claim:

1. A method of adjusting the audio level of a plurality of packetized audio signals in a transport stream, the method comprising:
   receiving the transport stream comprising a plurality of packets associated with the plurality of packetized audio signals;
   extracting packets corresponding to each packetized audio signal from the transport stream;
   for each of at least two packetized audio signals, contemporaneously:
      analyzing a first subset of packets corresponding to the packetized audio signal to extract an audio level of the packetized audio signal;
      comparing the audio level to a desired audio level;
      generating an adjustment signal based on the comparison between the audio level and the desired audio level; and
      adjusting a second subset of packets corresponding to the packetized audio signal according to the adjustment signal to provide audio adjusted packets.

2. The system of claim 1, wherein the first subset of packets is different than the second subset of packets.

3. The method of claim 1, wherein the desired audio level is provided as an external signal by an external controller coupled to the audio level adjustment block.

4. The method of claim 1, wherein at least some of the plurality of packets comprise an embedded gain control metadata value.

5. The method of claim 4, wherein the gain control metadata value is a dialnorm value.

6. The method of claim 4, wherein adjusting the second subset of packets comprises modifying the gain control metadata value of the second subset of the packets based on the adjustment signal.

7. A system for adjusting the audio level of a plurality of packetized audio signals in a transport stream, the system comprising:
   one or more input terminals for receiving the transport stream comprising a plurality of packets associated with the plurality of packetized audio signals;
   an audio signal extraction block coupled to the one or more input terminals to extract packets corresponding to each packetized audio signal from the transport stream, the audio signal extraction block further configured to sequentially transmit at least some of the packets to an audio level adjustment block;
   the audio level adjustment block configured to execute a sequence of steps for at least two packetized audio signals contemporaneously, the steps comprising, for each packetized audio signal:
      analyzing a first subset of packets corresponding to the packetized audio signal to extract an audio level of the packetized audio signal,
      comparing the audio level of the packetized audio signal to a desired audio level, and
      generating an adjustment signal based on the comparison between the audio level and the desired audio level; and
   an audio signal re-assembly block configured to adjust a second subset of packets corresponding to the packetized audio signal comprising the first subset of packets according to the adjustment signal to generate audio adjusted packets.

8. The system of claim 7, wherein the first subset of packets is different than the second subset of packets.

9. The system of claim 7, wherein the desired audio level is provided as an external signal by an external controller coupled to the audio level adjustment block.

10. The system of claim 7, wherein at least some of the plurality of packets comprise an embedded gain control metadata value.

11. The system of claim 10, wherein the gain control metadata value is a dialnorm value.

12. The system of claim 10, wherein the audio signal re-assembly block adjusts the second subset of packets by modifying the gain control metadata value of the second subset of the packets based on the adjustment signal.

13. The system of claim 10, wherein the adjustment signal identifies the corresponding packet and an adjustment required in the gain control metadata value in the packet.

* * * * *